United States Patent Office 3,244,496
Patented Apr. 5, 1966

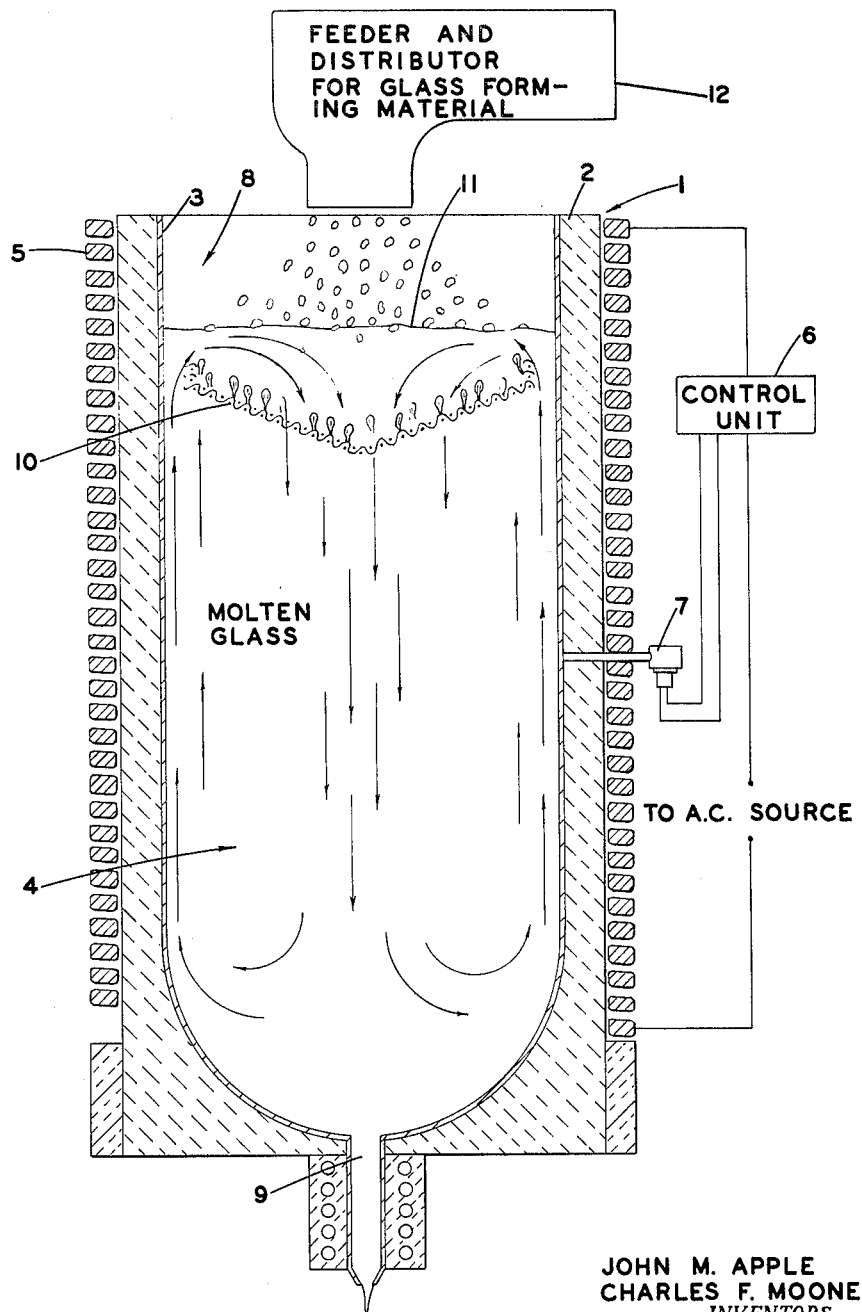

3,244,496
GLASS FURNACE FINING MEANS
John M. Apple, Henrietta, and Charles F. Mooney, Irondequoit, N.Y., assignors to Bausch & Lomb Incorporated, Rochester, N.Y., a corporation of New York
Filed July 2, 1962, Ser. No. 206,658
3 Claims. (Cl. 65—162)

This invention relates to a glass making furnace and more particularly to glass fining in continuously operable systems.

The principal effort in glass system technology, in recent years, has been directed at large volume output. Resulting systems have been large, expensive and wasteful of many tons of glass during starting up and shutting down. Such systems are particularly unsuited for comparatively small volume glass applications as ophthalmic and instrument lens blanks.

An imperative requirement to remove mechanically included air and chemically released gases, such as carbon dioxide and water vapor, has made it essential to provide within a glass system a fining chamber with a large interfacial area between air and the liquid glass phase. Two common means frequently combined for having a large interfacial area are: (1) To have a shallow large area tank through which the glass must flow after liquification and (2) to introduce comparatively large bubbles which rise rapidly and clear the melt unless the surface scum is too viscous. The first of these methods leads to stratification and inhomogeneity which must later be removed by vigorous stirring; the bubbles used in the second produce extra surface area which exists only for a brief time in the case of each bubble. Generally it is found that high temperature in the fining chamber is helpful in permitting small bubbles to rise more rapidly in the lower viscosity glass.

The above methods are compatible with large volume systems in that they require a large area fining chamber, a complex system for introducing a multiplicity of bubbles, and extra volume for stirring and temperature reduction or conditioning. This condition has been further complicated by the economic need to produce large glass volume rates from such large systems with their vast power expenditure, the large glass production rates necessitate the introduction of vast quantities of raw material per hour into a large melting chamber with a consequent mechanical entrainment of perhaps several cubic feet of air per hour. Other complications such as the melt cooling when large quantites of batch are introduced per unit time can be enumerated, but it is already apparent that such systems are not well suited for applications needing production under 100 pounds of glass per hour.

It is an object of this invention to provide glass fining method and apparatus applicable to continuous flow glass systems.

It is an object of this invention to provide glass fining method and apparatus applicable to continuous flow glass systems of any volume, from 1 quart for example to 1000 cubic feet or more.

It is an object of this invention to provide glass fining method and apparatus applicable to continuous flow glass systems of any volume and which removes all bubbles and actually produces glass undersaturated with dissolved gases at all temperatures up to the extreme temperature occurring in the melting system.

It is an object of this invention to provide glass fining method and apparatus applicable to continuous flow glass making systems of any volume with a complete fining operation occurring in substantially briefer time than heretofore allowed.

It is an object of this invention to provide a glass fining method and apparatus applicable to continuous flow glass making systems of any volume quickly completing fining with an improvement of homogenization rather than a dehomogenizing stratification.

The objects of this invention are accomplished by eliminating entrapped air and by-product vapors not involved in glass solution reactions at the time of entry of the batch at the molten glass surface, by providing bubble nucleation below the melt surface at a point where the chemical processes are sensibly complete, by providing a gas to melt interface perhaps four times the pot diameter, and by utilizing recirculation to rerefine all of the glass several times on the average while in the melting chamber. The release of entrapped air and excess by-product vapors such as carbon dioxide, sulfur dioxide, nitrous oxide, and water at this surface is made possible by two features of this invention. First the material is premixed to give every grain the size of a wheat grain or larger nearly the same average chemical composition and this even distribution is maintained so that proper proportions of all materials are geometrically near to each other until flux melting and dissolution of the refractory ingredients has occurred. Second the molten glass temperature is maintained well above the melting point even on the melt surface so that every grain of batch is converted to a liquid within five seconds. It is correct to say that entrapped air never enters the melt, and that by-product vapors not chemically combined in catalyzing reactions are also released as free bubbles just on the glass surface.

A large surface area for bubble nucleation in the glass stream is provided by a screen or perforated sheet of platinum located below the glass surface. This screen can be located anywhere from the neck of the orifice to just below the melt surface. The use of the screen insures that every molecule of glass passes within a short distance of a nucleating surface because the glass flow is through the screen.

An interface between gas and liquid glass occurs at each bubble. Bubbles initiating on the screen or on a pot wall adhere to the surface and grow to the point where several join to form one large enough so that buoyancy causes it to neck down and break free. These accelerate to the surface and break. During their persistance on the screen or walls, however, they provide a large interfacial surface area through which supersaturated gas in the melt is vaporized to increase the bubble size. Considering just the bubbles on the screen and assuming that their totaled cross-sectional area approximately equals the area of the screen, the interfacial area of such spherical bubbles is approximately four times the screen area. In actuality the bubbles are elongated to have even larger area to volume ratios, and they cover even more than the area of the screen because large ones override small ones. In the presence of such a mass of bubbles, every molecule of the molten glass will at times be on an interfacial surface, a condition greatly superior to that in any previous system.

When the screen is suspended between the top and bottom of the pot, glass rising by convection along the walls flows toward the center and passes again through the screen. The orifices of the screen and the bubbles held by it extrudes, and continually mixes the flowing glass. This deformation of regions of dissimilar compositions facilitate the diffusion of molecules and reduces striae as well as removing gas. Thus, the glass formed over a period of minutes has ample opportunity to react fully and mix with other glass, thereby improving the homogeneity.

A specific embodiment of this invention will become apparent to those skilled in the art from the following detailed description taken in conjunction with the annexed drawings which illustrate the preferred embodiment.

The drawing illustrates a melting pot for receiving a body of molten glass to form a melting chamber with a screen to assist in the homogenizing of the glass prior to flowing through the exit orifice positioning the lower portion of the melting pot.

A continuous flow glass furnace if adapted to include adequate heating installation may be substantially reduced in its physical size. An illustration of this type is shown in the drawings whereby a heating unit encompasses the melting pot in such a manner that the energy is transferred from the heating unit to the body of glass received within the melting pot. The screen is positioned intermediate the exit orifice and the surface of the molten glass in a submerged position to assist in the fining of the melted glass immediately subsequent to melting. It is desirable that the feed rate be controlled so that no partially melted raw batch is permitted to engage the screen. The screen operates in a manner similar to a filter which has very extensive contact with the melted glass and thereby assists in eliminating striae and degasifies the melted glass as it passes through the screen. The combined melting and homogenizing operation disclosed in the drawings is a means of substantially reducing the physical size of the glass furnace and also reducing the melting and homogenizing operation time to a matter of minutes which has previously taken hours and even days to accomplish. The overall economic advantage in such an installation is clearly shown by reducing the change over time from batch in running ophthalmic lenses.

Referring to the drawings the melting pot 1 is formed with a layer of Alundum 2 or any suitable insulating means providing sufficient strength to maintain rigidity of the pot. A liner 3 is formed on the inner surface of the Alundum layer to receive a body of molten glass 4. The physical structure as illustrated provides a melting pot of a small size. A heating unit including an induction coil 5 surrounds the layer of Alundum to provide induction heating forming eddy currents in the liner 3 and in the outer periphery of the body of molten glass 4.

The induction coil 5 is connected to a source of alternating current electrical energy as indicated through the control unit 6. The heat sensing element 7 senses the heat in the melting chamber and is connected to the control unit 6 to control the flow of electrical energy in response to the temperature in the melting chamber 8.

An orifice 9 is located at the lower portion of the melting chamber 8 to permit the flow of homogenized glass from the melting chamber to subsequently form ophthalmic lenses or any suitable use desired for this type of glass.

The screen 10 is positioned in the upper portion of the melting chamber 8 and submerging beneath the surface 11 of the molten glass 4. The screen 10 is positioned concentric with the melting chamber and being of a smaller diameter than the inner periphery of the melting chamber 8, permits the upward flow of the convection currents set up in the molten glass 4 to flow around the screen. The screen is preferably formed of a platinum wire forming a plurality of openings of roughly .001″ which provides a screening action of the melted glass as it flows downwardly in the center portion of the melting portion 8.

A feeder and distributor 12 meters the rate of the feed of the raw batch from a suitable supply chamber and evenly distributes raw batch on the surface of the molten glass 4. The temperature in the molten glass body 4 is sufficiently high to melt the raw batch within a short interval of time from the instant the glass is deposited on the surface. The glass is melted before the movement of the convection currents causes the melted glass to pass through the screen. The air entrained in the raw batch is permitted to rise upwardly and be released from the surface 11 in the molten glass 4. The raw batch is preferably sprinkled on the surface in the form of pellets which consist of an essentially even distribution of all components in the raw batch. These pellets provide a nucleus for initiating formation of the bubbles. Upon melting of the pellet, the bubble is released and permitted to rise from the surface of the glass.

The feeder meters the supply of pellets at an even rate from the supply chamber and distributes the pellets evenly on the surface 11 of the molten glass 4. The control unit operating in response to the heat sensing element 7 controls the flow of electrical energy to the induction coil 5 located about the outer periphery of the melting pot 1 which induces current in the liner 3 and the outer periphery of the molten glass 4 to heat the molten glass body 4. The heating on the radial periphery of the body of molten glass causes convection currents which move upwardly adjacent to the liner 3 of the pot 2. The convection currents rise to the surface and flow radially inwardly and then downwardly through the center portion of the melting chamber 8. The temperature of the body of molten glass is substantially above melting temperature and accordingly melts the pellets lying in the surface within a few seconds. Entrained air in the pellets and gases formed by the melting of the flux and the glass forming refractory material of the raw batch are permitted to rise and escape from the surface 11 of the body of molten glass 4. The glass in the center portion of the melting chamber 8 which moves downwardly may be saturated or super-saturated with gas and the presence of a screen provides a nucleus for formation of a multiplicity of bubbles. The bubbles form on the screen and gradually build up in size until they are released from the screen and then move upwardly. The bubbles rise because the downward motion of the molten glass is substantially less than the upward movement of the bubbles.

An additional feature is accomplished by placing the screen in a position as shown. The screen operates as a homogenizing device causing any impurities which may be present in layers or concentrated in one area to be evenly distributed throughout the glass due to the fine screen as the glass passes through the multiplicity of orifices formed by the screen. In this manner the screen operates as a degassing and homogenizing element which produces a fining operation adjacent to the melting chamber. The screen also prevents any unmelted raw batch from passing through the screen and ever gaining exit from the orifice in the lower portion of the melting pot 1. For ideal operations it is intended that no raw batch ever reach the screen, however, in event that any portions of the unmelted raw batch did reach the screen they could not pass until completely melted. The combined operation of melting and fining set forth in illustration and described above is completed in a matter of seconds or minutes at most. The fining operation is perfected to a degree where the quality of glass derived from the method as illustrated by this apparatus is of a quality salable for ophthalmic lenses.

It is apparent that various modifications and arrangements might be made other than disclosed herein and that the present disclosure is not limitive but illustrative only. The invention covering all variations is claimed in the following claims:

We claim:
1. In a glass furnace the combination comprising, a melting pot defining a melting chamber, heating means around said melting pot for creating convection current flow of the molten glass in the melting chamber, temperature sensing means in said melting chamber, regulating means connected to said sensing means and said heating means for controlling heating of the melting chamber in response to temperature conditions in said melting chamber, means defining a charging opening at the top of said melting chamber for receiving glass forming material for the formation of molten glass, means defining a discharge opening at the bottom of said melting chamber, a screening device located intermediate said charging opening and said discharge opening and transverse of fluid movement for screening of molten glass for homogenizing and degassing molten glass as the glass is passed through said screen.

2. In a continuous flow glass furnace having a melting chamber, a combination comprising means defining a vertically oriented melting chamber, having a charging opening at the top and a discharge opening at the bottom, a source of electrical energy, an induction heating unit on the outer portion of said means defining said melting chamber causing convection current flow of the molten glass, a thermo control means connected to said source of energy and said heating unit for sensing thermo conditions in said melting chamber and controlling the flow of electrical energy from said source of electrical energy to said heating unit, a screening means positioned intermediate the charging opening and the discharging opening and centrally located in said means defining said melting chamber, said screening means thereby operating as an homogenizing means and a degassing means in said melting chamber as melted glass is circulated through said screen.

3. In a continuous flow glass furnace having a melting chamber the combination comprising, means defining a melting chamber having a charging opening in the upper portion and a discharge opening in the lower portion for receiving a body of molten glass, induction coil concentrically located around said means defining said melting chamber operating as a heating unit for the body of molten glass received in said melting chamber, a screen located within said melting chamber near the charging opening providing a partial barrier between the opening in the upper portion of said chamber and said discharge opening in the lower portion of said melting chamber and substantially isolating the melting process in said melting chamber to a zone adjacent the opening in the upper portion of said chamber, said induction coil providing heating on the peripheral portion of said melting chamber and causing an upward convection current on the outer periphery of the molten glass body and a downward convection current in the central portion of said body of molten glass through said screen to thereby homogenize and degas the body of molten glass and produce a fining condition for production of quality glass.

References Cited by the Examiner
UNITED STATES PATENTS

| | | | |
|---|---|---|---|
| 2,212,528 | 8/1940 | Slayter | 65—346 X |
| 2,262,070 | 11/1941 | Turk | 65—347 X |
| 2,465,283 | 3/1949 | Schlehr | 65—335 X |
| 2,679,749 | 6/1954 | Poole | 65—161 X |

FOREIGN PATENTS 741,606  12/1955  Great Britain.

DONALL H. SYLVESTER, *Primary Examiner.*